3,511,798
VINYL MONOMER-MALEIC ANHYDRIDE POLYMER-CONTAINING AQUEOUS GEL COMPOSITIONS AND METHOD OF PREPARING SAME

Henry V. Isaacson, Oak Forest, and David W. Young, Homewood, Ill., assignors to Sinclair Research, Inc., New York, N.Y., a corporation of Delaware
No Drawing. Filed Mar. 29, 1966, Ser. No. 538,220
Int. Cl. C08f 45/22, 45/24
U.S. Cl. 260—29.6                                    10 Claims

ABSTRACT OF THE DISCLOSURE

Gelation of a normally liquid, aqueous solution of a water-soluble salt of a vinyl monomer-maleic anhydride polymer, e.g. a styrene-maleic anhydride polymer, is effected by adding to the solution aluminum, ferric or zirconium cations. The polymer has a Staudinger average molecular weight of at least about 250,000, e.g. about 500.000 to 1,000,000. The resultant gel is stable and firm.

---

This invention relates to a method of effecting gelation of aqueous solutions of water-soluble salts of vinyl monomer-maleic anhydride polymers.

Small amounts of water-soluble salts of polymers of monovinyl compounds and maleic anhydride effect a startling increase in the viscosity of water when dissolved therein. So pronounced is the water thickening ability of vinyl monomer-maleic anhydride resin salts that, for example, as little as 1 percent by weight of an ammonium salt of a high molecular weight styrene-maleic anhydride resin will provide a water solution of about 200 centipoises viscosity. Increasing the salt concentration to 3 percent by weight of the solution will effect a viscosity of about 800 centipoises and 5 percent will yield an aqueous solution of about 3000 centipoises viscosity. The vinyl monomer-maleic anhydride resin salt solutions are particularly interesting in that a single solution will appear to have a wide range of viscosities when different conditions of preparation of the salt, the ratio of vinyl monomer to lutions are pseudoplastic and can exhibit thixotropy. Thus, water-soluble salts such as the alkali metal and ammonium salts of vinyl monomer-maleic anhydride resins have been found useful for diverse water-thickening applications such as textile finishing, printing paste, cold water paints and the like.

While the water-thickening effect of soluble vinyl monomer-maleic anhydride resin salts may vary according to the molecular weight of the polymeric resin, the method of preparation of the salt, the ratio of vinyl monomer to maleic anhydride in the polymer, the pH of the water solution, etc., the degree of thickening rarely approaches the point of gelation at salt concentrations lower than about 15 to 30 percent, by weight of the solution. Therefore, where aqueous gels have been desired, rather than just viscous solutions, the requisite large concentrations of vinyl monomer-maleic anhydride resin salts have made their use as gelling agents impractical. Thus, it would be desirable if there could be devised a method of inducing gelation in aqueous solutions having dissolved therein vinyl monomer-maleic anhydride resin salts at relatively low concentrations which are generally known to effect only a viscosity increase and not to provide a gel.

It has now been discovered that the addition of a polyvalent cation such as those provided by aluminum, ferric and zirconium salts to an aqueous solution, even a dilute solution, of a water-soluble salt of a vinyl monomer-maleic anhydride polymer will result in the formation of a firm gel, often in about a half-hour to five hours. The rate of gel formation is controllable, as it is directly proportional to the concentrations of the vinyl monomer maleic anhydride resin salt and the polyvalent cation, the molecular weight of the polymeric resin and the pH and temperature of the solution. The process of this invention finds utility in providing aqueous gels for insecticide carriers, grease additives, paper coatings, fillers for wood etc.

In accordance with the method of the present invention, the operable vinyl monomer-maleic anhydride polymeric resins, of which the water-soluble salts are used herein, are polymers having a Staudinger average molecular weight of at least about 250,000, preferably at least about 500,000, and may be as high as 1 million, or more. The polymers contain about 1 to 4 moles, preferably about 1 to 3 moles, of one or more polymerizable monovinyl compounds of 2 to about 12 carbon atoms per mole of maleic anhydride. Suitable monovinyl compounds include for instance, alpha-olefins such as ethylene, propylene isobutylene, butylene, pentylene, hexylene, heptylene, octylene, nonylene, decylene and dodecylene; vinyl ether such as methylvinyl ether, ethylvinyl ether, n-butylvinyl ether and isobutylvinyl ether; and vinyl aromatic such as vinyl toluene, styrene and the like. The preferred vinyl monomer is styrene. If desired, maleic acid can be used instead of maleic anhydride in formation of the polymer.

The vinyl monomer-maleic anhydride polymer of the invention can be prepared, for instance, by solution polymerization as described in copending U.S. application Ser. No. 427,080, filed Jan. 21, 1965, now Pat. No. 3,423,355, where the monomers are polymerized in a suitable solvent employing as the polymerization catalyst a free radical catalyst having a half-life of up to one hour at 80° C. such as, for instance, diisopropyl peroxy dicarbonate, tertiary butyl peroxy pivalate and the like. Temperature of about 30° C. to 80° C., preferably 50° C. to 60° C., can be employed. Preferred solvents are inert ketones such as methylethyl ketone, acetone, acetophenone, etc.

Suitable salts of the above vinyl monomer-maleic anhydride resins are those which are substantially water soluble and include, for example, the salts of alkali metals such as sodium, potassium and lithium, ammonium salts, etc. It is not necessary that the polymer salt be full salt; what is required is that sufficient carboxyl group of the polymer are converted to their salt forms to render the resin substantially water-soluble. It is often desirable, for example, that the resin salt be soluble in water at room temperature at concentrations of about 2 percent or more, based on the weight of the water.

Preparation of the salts can be, for instance, by simple hydrolysis of the vinyl monomer-maleic anhydride polymer with water in presence of, for instance, an alkali metal hydroxide or ammonium hydroxide. The hydrolysis can be conveniently carried out by making a slurry in distilled water of, say, 2 moles or more of alkali metal hydroxide per mole of maleic anhydride in the polymer and heating the slurry over a water bath until the hydrolysis is complete. The aqueous solution which is suitable for subsequent gel formation according to the method of the present invention will often contain at least about to 20 weight percent of the water-soluble vinyl monomer maleic anhydride resin salt, the essential balance of the solution being water.

Suitable polyvalent cations which effect gelation of the solution by their addition include $Al^{+++}$, $Fe^{+++}$ and $Zr^{++++}$ ions. These metal ions may be supplied, for example, in the form of their water-soluble salts such as the chlorides, sulfates, acetates and hypophosphites. Generally, in order to provide gelation, the polyvalent cation-affording salt should be added in an amount sufficient to provide at least about one equivalent weight of aluminum, iron or zirconium cation for every 2 mols maleic anhydride in the resin salt. The amount of allic cation added to the solution is generally about 1 to 0 percent by weight of the resin salt therein, preferably about 2 to 8 percent. For most efficient gelation the perature of the vinyl monomer-maleic anhydride resin solution is preferably maintained in the range of about C. to 75° C.

he following examples serve to illustrate the gel-forming process of the invention:

EXAMPLE I 5 percent by weight aqueous solution of a full ammonium salt of a styrene-maleic anhydride polymer having an average molecular weight of approximately 500,000 a molar ratio of styrene to maleic anhydride of 1 to 1 heated to 50 to 60° C. and, while stirring, basic aluminum acetate was added (20 percent by weight of the salt, equivalent to 3.3 weight percent of aluminum). Within one hour after the addition was complete, a colorless gel had formed.

EXAMPLE II mploying the method of Example I, similar results obtained by the addition of ferric hypophosphite to solution of the ammonium salt of the styrene-maleic ydride resin of Example 1. Use of the ferric salts as ing agents results in reddish colored gels.

EXAMPLE III

Ising the same procedure as in Examples I and II, a le gel is formed by the addition of zirconium sulfate n aqueous solution of the ammonium salt of the ene-maleic anhydride resin of Example I.

queous vinyl monomer-maleic anhydride resin gels ared according to the method of the present invention, especially those prepared by the addition of an aluminum salt, are stable for long periods of time and, unlike formed with cellulose-base gelling agents, need no ervative against bactericidal attack.

is claimed:

. A normally gelatinous composition of matter consisting essentially of an intimate admixture of (A) about 2 to 20 weight percent of a water-soluble salt of a polymer of a monovinyl compound of 2 to about 12 carbon atoms and maleic anhydride, said polymer having an average molecular weight of at least about 250,000, (B) about 1 to 10 percent by weight of (A) of a polyvalent cation selected from the group consisting of aluminum, ferric and zirconium cations and (C) an essential balance of water.

2. The composition of claim 1 wherein the monovinyl compound is styrene.

3. The composition of claim 1 wherein the molar ratio of monovinyl compound to maleic anhydride in the copolymer is about 1:1 to 4:1.

4. The composition of claim 3 wherein the water-soluble salt of the polymer is selected from the group consisting of alkali metal and ammonium salts.

5. The composition of claim 4 wherein the polyvalent cation is provided by basic aluminum acetate.

6. The composition of claim 4 wherein the monovinyl compound of the polymer is styrene and the polyvalent cation is provided by a water-soluble ferric salt.

7. The composition of claim 4 wherein the monovinyl compound of the polymer is styrene and the polyvalent cation is provided by a water-soluble zirconium salt.

8. The composition of claim 1 wherein the cation is aluminum.

9. The composition of claim 1 wherein the cation is ferric.

10. The composition of claim 1 wherein the cation is zirconium.

References Cited

UNITED STATES PATENTS 3,026,281   3/62   Harren et al.

MURRAY TILLMAN, Primary Examiner

W. J. BRIGGS, SR., Assistant Examiner

U.S. Cl. X.R.

260—78.5; 117—155, 161

UNITED STATES PATENT OFFICE
CERTIFICATE OF CORRECTION

Patent No. 3,511,798         Dated May 12, 1970

Inventor(s) Henry V. Isaacson and David W. Young

It is certified that error appears in the above-identified patent and that said Letters Patent are hereby corrected as shown below:

Delete line 41 of column 1 in its entirety beginning with the word "of", and insert therefor --of physical force are imposed on the solution. These so--.

Column 2, line 22, pluralize "aromatic".

SIGNED AND
SEALED
SEP 29 1970

(SEAL)
Attest:

Edward M. Fletcher, Jr.
Attesting Officer

WILLIAM E. SCHUYLER, JR.
Commissioner of Patents